United States Patent [19]

Nadan

[11] Patent Number: 4,772,949
[45] Date of Patent: * Sep. 20, 1988

[54] HIGH RESOLUTION TELEVISION TRANSMISSION SYSTEM

[75] Inventor: Joseph S. Nadan, New York, N.Y.

[73] Assignee: North American Philips Corp., New York, N.Y.

[*] Notice: The portion of the term of this patent subsequent to Jun. 2, 2004 has been disclaimed.

[21] Appl. No.: 17,307

[22] Filed: Feb. 20, 1987

Related U.S. Application Data

[63] Continuation of Ser. No. 648,546, Dec. 21, 1984, Pat. No. 4,670,783.

[51] Int. Cl.⁴ ............................................. H04N 7/04
[52] U.S. Cl. ..................................... 358/141; 358/142
[58] Field of Search ................... 358/141, 142, 11, 12, 358/15, 133, 186, 188

[56] References Cited

U.S. PATENT DOCUMENTS 4,670,783 6/1987 Naden ................................. 358/141

Primary Examiner—Howard W. Britton
Assistant Examiner—David E. Harvey
Attorney, Agent, or Firm—Edward W. Goodman; Gregory P. Gadson

[57] ABSTRACT

A television transmission system capable of transmitting and receiving a high-resolution television signal having a wider than standard aspect ratio, which high-resolution television signal is, in part, compatible with standard television receivers. In an NTSC format, the high-resolution television signal has an active bandwidth of 14.0 MHz and includes picture frames having 657 scanning lines and a 5⅓:3 aspect ratio. This high-resolution television signal is converted into two transmission signals, a first of which being compatible with standard television receivers and including a center low-frequency portion of said high-resolution television picture frame, the number of lines therein having been converted to 525 lines, and a second of which including the remaining information in said high-resolution television signal.

11 Claims, 6 Drawing Sheets

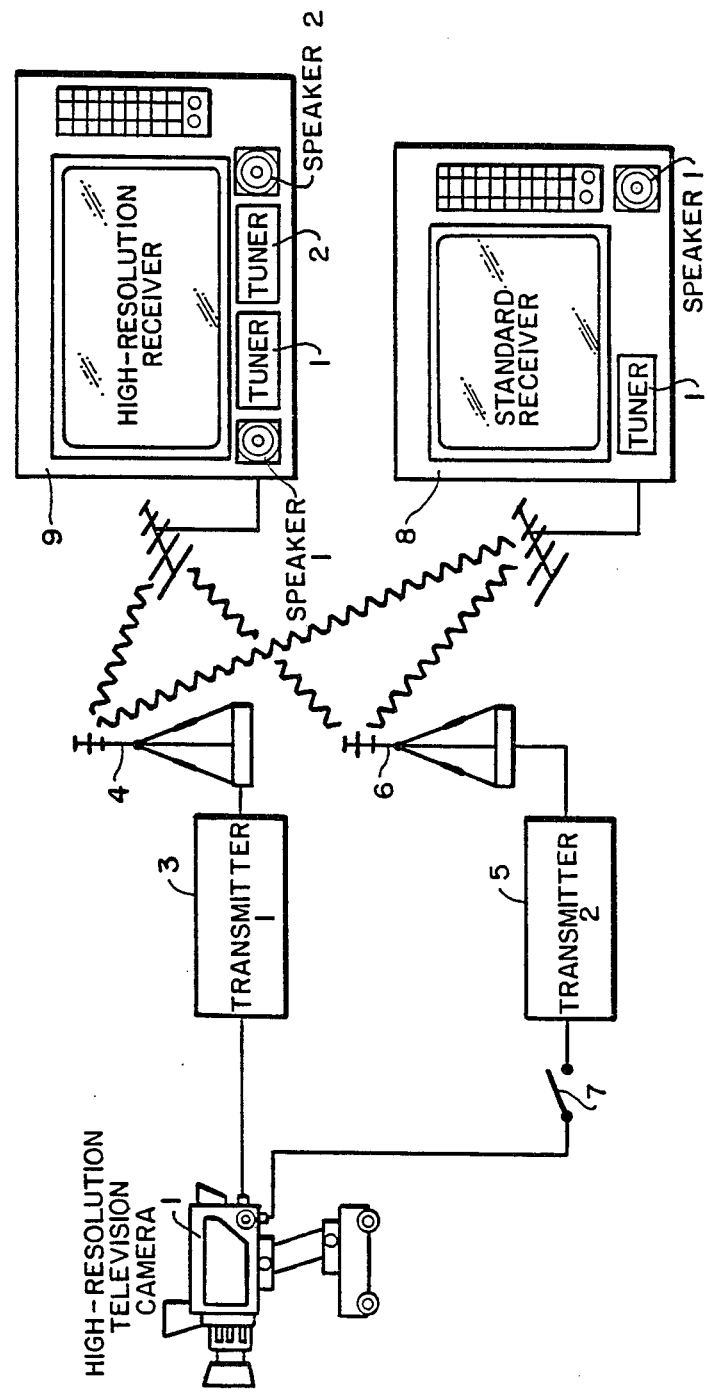

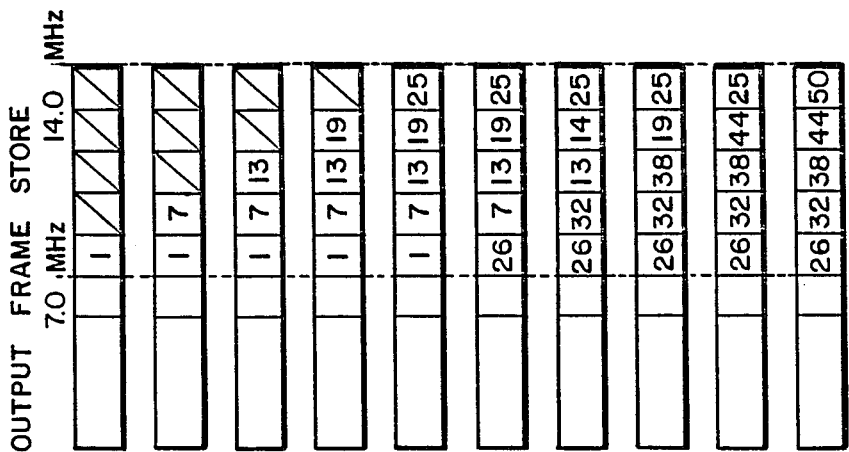
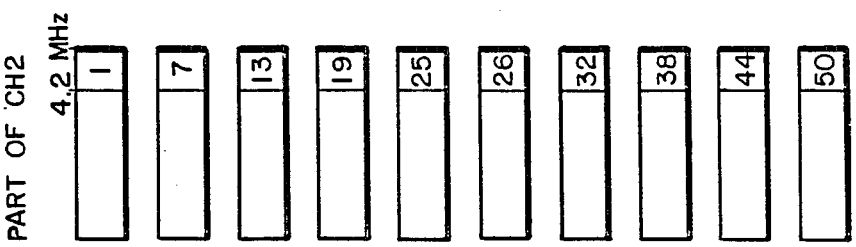
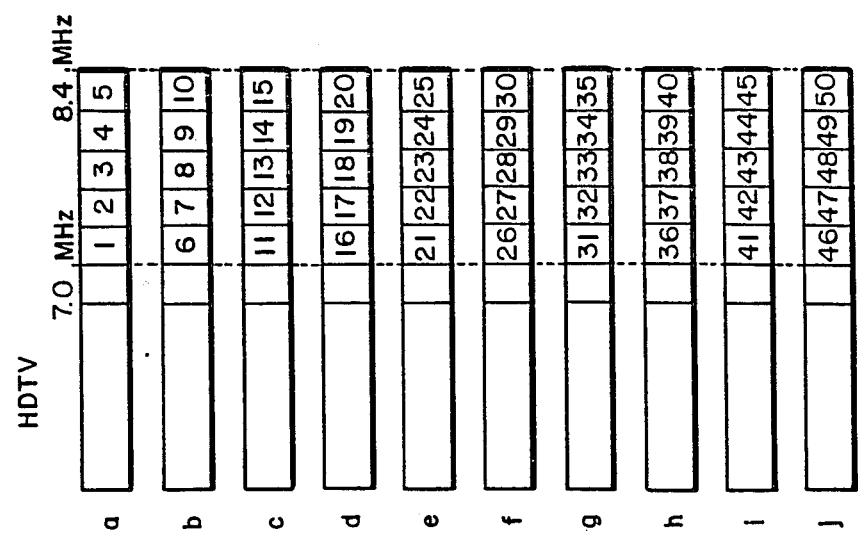

HIGH RESOLUTION TELEVISION TRANSMISSION SYSTEM

CROSS-REFERENCE TO RELATED APPLICATION

This is a continuation of application Ser. No. 684,546, filed Dec. 21, 1984, now U.S. Pat. No. 4,670,783.

BACKGROUND OF THE INVENTION

The invention relates to a television transmission system capable of transmitting a high-resolution television signal.

One of the most disturbing characteristics of present day television is its inadequate vertical resolution which manifests on large displays by the viewer being able to discern the individual raster lines. Various systems have been proposed having an increased number of vertical scanning lines. However, these systems are not feasible as they require an excessive amount of bandwidth (e.g. 30 MHz.). Other systems have been proposed in which additional lines are transmitted over a separate channel or are generated in the television receiver by interpolation.

All the above systems require an increase in cost allocated to both the broadcaster as well as the consumer. This brings into play the marketing of the new television system. It has been shown that increased resolution alone may not be sufficient to offset the increase in cost of a television receiver to the consumer.

Copending U.S. patent application Ser. No. 597,327, filed Apr. 6, 1984, in the name of the subject inventor, which application is hereby incorporated by reference, discloses a high-resolution television transmission system which increases the aspect ratio by 33.3%, from a standard ratio of 4:3 to 5⅓:3, and increases the number of scanning lines by 50%. For an NTSC compatible system, this results in picture frames having 787 lines which are interlaced in three 90 Hertz fields (the picture frame rate remaining at 30 Hertz). While this system does offer increased vertical resolution, the horizontal resolution remains virtually unchanged thereby resulting in a resolution imbalance.

SUMMARY OF THE INVENTION

The object of the present invention is to provide a high-resolution television transmission system compatible with existing television receivers in which increases in both the perceived horizontal and vertical resolutions are balanced.

The above object is achieved in a television transmission system capable of transmitting and receiving a high-resolution television signal forming picture frames having a width which is wider than that of a standard aspect ratio and having a bandwidth greater than that of a standard television signal. This high-resolution television signal can be displayed on a standard television receiver having the standard aspect ratio, characterized in that the picture frame comprises 1.25m scanning lines, where m is a standard number of scanning lines. This high-resolution television signal is being converted into a first and a second transmission signal, the first transmission signal being compatible with the standard television receivers and including m scanning lines, wherein the first transmission signal includes information relating to a selected portion of the picture frames corresponding to the standard aspect ratio, the information being frequency limited to a low-frequency band of the high-resolution television signal corresponding to the bandwidth of the standard television signal, and the second transmission signal also including m scanning lines, wherein the second transmission signal includes the low-frequency band of the remaining lines of the 1.25m scanning lines in the selected portion of the picture frame, the low-frequency band of the information from the portion of the picture frames not included in the selected portion, and a high-frequency band of the high-resolution television signal corresponding to the remaining bandwidth thereof above the low-frequency band.

The present invention is based on the recognition that there is a practical limit above which the human vision system is unable to perceive small, rapidly moving objects in a picture. Hence it is possible to attain twice the perceived horizontal resolution in only two channels of bandwidth by refreshing high spatial frequency information at a rate less than the picture frame rate.

In view of the above, in the television system of the present invention is further characterized in that the high-frequency band is divided, by frequency, into p sections, where p is an integer, the sections are being multiplexed into the second transmission signal, whereby one of the sections is included in a respective picture frame formed by the second transmission signal, the high-frequency band in its entirety being included in p successive picture frames.

The present invention is further based on the recognition that the required bandwidth of a system increases in proportion with the square of the number of lines. It is therefore preferable to use the minimum number of lines in order to minimize the bandwidth required and/or use the minimum number of standard broadcast channels. It has been found that the perceived vertical resolution of a television picture can be increased not only by increasing the actual number of lines, but also by retaining the standard signal format for transmission, for example, two fields forming a picture frame in which the lines therein are interlaced, and by forming, prior to display, intervening lines in each field by spatial and temporal interpolation. This effectively generates a sequential display in which each of the fields forms a complete picture frame.

Based on the above, in the television system of the subject invention the high-resolution television signal, prior to being displayed, is subjected to an interlace-to-sequential scan conversion thereby increasing the perceived vertical resolution thereof on display.

DESCRIPTION OF THE DRAWINGS

With the above and additional objects and advantages in mind as will hereinafter appear, the subject invention will be described with reference to the accompanying drawings, in which:

FIG. 1 shows a television transmission system incorporating the present invention;

FIGS. 4A–4C show, graphically, the temporal multiplexing and the subsequent build-up of the high-resolution television signal;

DESCRIPTION OF THE PREFERRED EMBODIMENT

Figure 3A:
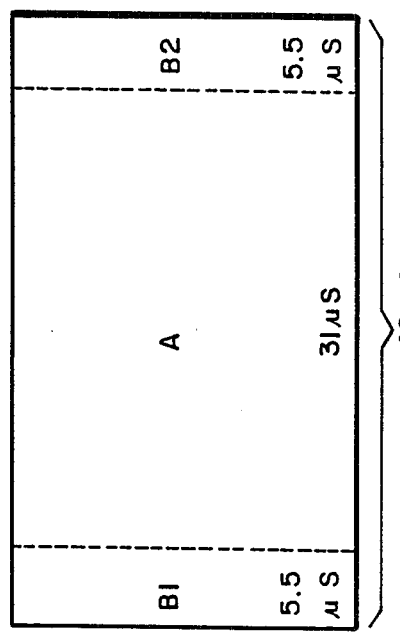
FIGS. 3A–3C show graphically the conversion of a high-resolution television signal, on display, into two standard television signals, on display.

A television transmission system in accordance with the present invention is shown in FIG. 1. A television camera 1 is adapted to generate a high-resolution television signal and contains circuitry for converting the signal into a first and a second transmission signal of which at least the first transmission signal conforms with, for example, the NTSC television standard. The first television signal is then applied to a first transmitter 3 with its associated transmission channel, shown here as antenna 4, while the second transmission signal is simultaneously applied to a second transmitter 5 with its transmission channel, shown as antenna 6. For a standard broadcast, a switch 7 is inserted before the second transmitter 5 and interrupts any signals thereto.

The first transmission signal is viewable on a standard television receiver 8 having a single tuner. However, with a high-resolution television receiver 9, both transmission signals may be simultaneously received, respectively, by the two tuners therein and reconverted into the high resolution television signal.

Figure 2:
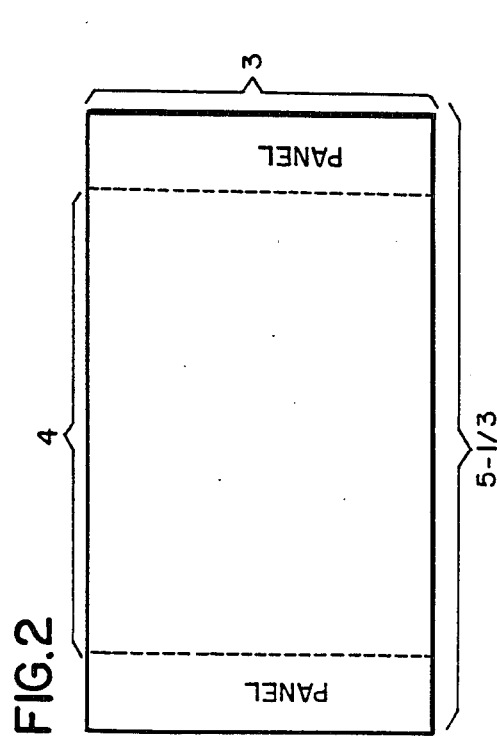
FIG. 2 shows a representation of a display obtainable with the present invention.

As illustrated in FIG. 2, the television transmission system of the present invention generates a high-resolution television signal for forming a picture on display having an aspect ratio of $5\frac{1}{3}:3$. This is in contrast with the standard displayed picture having an aspect ratio of 4:3 which is conveniently shown in the center of the wider display picture. This $5\frac{1}{3}:3$ aspect ratio is selected to support the simultaneous viewing of two standard 4:3 aspect ratio signals, without overlap, on the same display.

Each picture frame of the high-resolution television signal is not only wider than the standard television picture frame, but also includes 25% more scanning lines and has a significantly higher bandwidth. For the NTSC standard, this results in 657 scanning lines, each having a time duration of approximately 42 $\mu$S, and a bandwidth of 14.0 MHz. (as opposed to 4.2 MHz.) for the active video signal. As indicated in the U.S. patent application Ser. No. 597,327, in order to transmit the signal over standard television channels, it is necessary to convert the high-resolution television signal into at least two transmission signals compatible with the relevant standard, which transmission signals are then simultaneously transmitted over separate standard television channels.

Figure 3C:
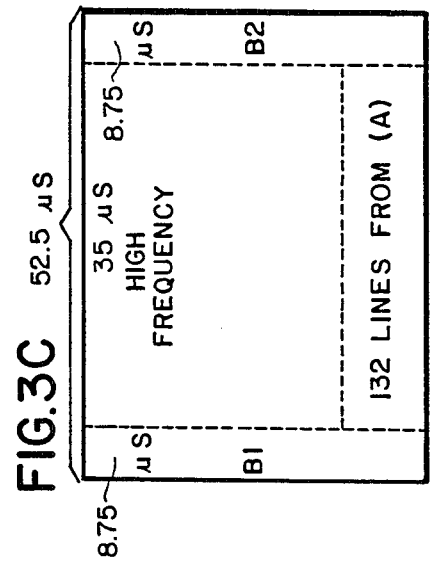
Figure 3B:
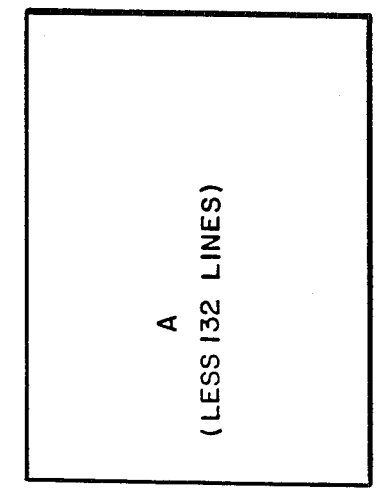

FIGS. 3A, 3B and 3C show picture frames resulting from the display of the high-resolution television signal and of the two transmission signals, respectively. In order to conform to standard television channel limitations, for example 525 lines/frame, each line having a duration of approximately 52.5 $\mu$S, and a bandwidth of 4.2 MHz., the central portion A of the high-resolution television picture frame (FIG. 3A), corresponding to the aspect ratio of a standard television picture frame, is separated from the rest of the high-resolution picture frame, bandwidth limited to 7.0 MHz., and the number of lines therein converted to that of the relevant standard (e.g. 525 lines). This signal then forms a first of the two transmission signals (FIG. 3B) and is viewable on a standard television receiver, albeit with the standard width and resolution. The remaining portions of the high-resolution television signal are combined and form a second of the two transmission signals which may also be viewable on a standard television receiver (FIG. 3C).

In order to double the horizontal resolution, the bandwidth of the high-resolution television signal, having 657 scanning lines per picture frame and a $5\frac{1}{3}:3$ aspect ratio, would be $3\frac{1}{3}$ times that of an NTSC channel. This is not acceptable as it would then require four NTSC channels.

It has been found that human vision requires a finite period of time to perceive changes in images. In general, the difficulty in perceiving an image increases as its subtended spatial angle decreases and/or its rate of motion increases. The operational impact of this is that it is unnecessary to transmit the high spatial frequency information in pictures at the standard NTSC 30 frames-per-second rate. The required transmission bandwidth may be significantly reduced without affecting the perceived horizontal resolution by transmitting low spatial information (below 7.0 MHz.) at the standard frame rate, and refreshing high spatial frequency information (above 7.0 MHz.) below the standard frame rate.

FIGS. 4A-4C each show graphically the bandwidth envelopes for ten consecutive television picture frames (a-j). FIG. 4A represents an original high-resolution television signal having a bandwidth of 14.0 MHz. In each of the ten picture frames, that portion above 7.0 MHz. is divided into five frequency bands. FIG. 4B represents the bandwidth envelope for that part of the second television transmission signal used to transmit the high frequency information. The number within this frequency band, in each bandwidth envelope frame, relates to the actual frequency band in the original high-resolution television signal. In a high-resolution television receiver, these frequency bands are stored, along with the rest of the signal and over the course of several television picture frames, the high spatial frequency information is built-up and refreshed as shown in FIG. 4C.

TABLE 1

| | Rate of Refresh - Hz. | | | | | |
|---|---|---|---|---|---|---|
| | Frequency Band | | | | | |
| | 1 | 2 | 3 | 4 | 5 | |
| Method a | 6 | 6 | 6 | 6 | 6 | simplest |
| Method b | 10 | 8 | 6 | 4 | 2 | |
| Method c | 12 | 10 | 4 | 2 | 2 | better |

Table 1 illustrates three methods with which the various frequency bands may be refreshed. In Method a, each of the frequency bands are refreshed at the rate of 6 hertz, for example, once every five picture frames. The description of the preferred embodiment is based on this method for purposes of illustration only. Methods b and c show various other weighted rates of refresh. Method c is much closer to the optimum for human vision wherein the lower frequency bands of the high spatial frequency information are refreshed at a higher rate than the upper frequency bands thereof.

Figure 5:
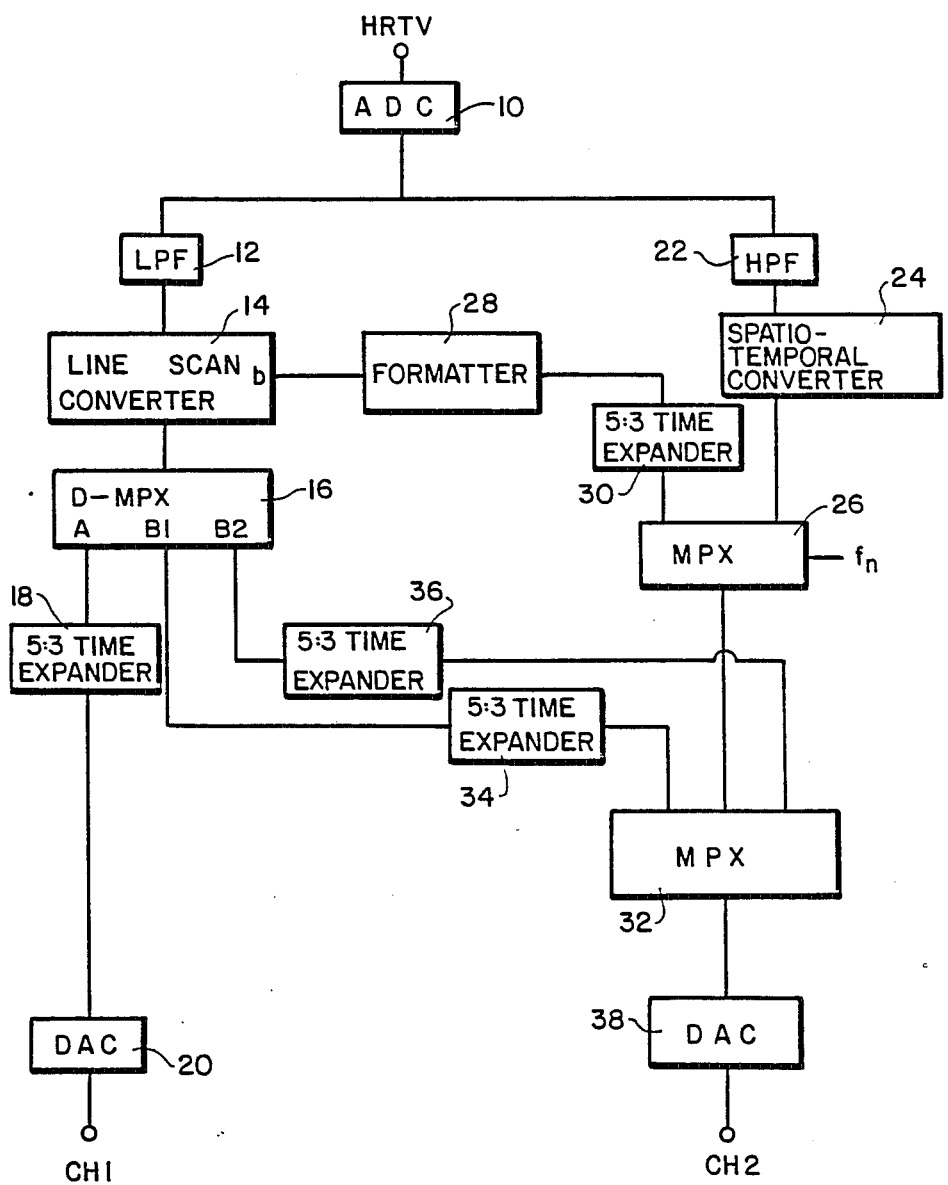
FIG. 5 shows, in block diagram form, an embodiment for converting the high-resolution television signal into two transmission signals.

FIG. 5 shows, in block diagram form, an embodiment for converting a high-resolution television signal into two transmission signals. The active video portion of the high-resolution television signal is applied to an analog-to-digital converter (ADC) 10. The digital output from ADC 10 is then applied to a lowpass filter 12 having a cut-off frequency of 7.0 MHz., the output therefrom being applied to a line scan converter 14. Line scan converter 14 transforms the 657 lines per frame digitized and filtered high-resolution television signal into 525 lines-per-frame, for example by converting every five lines a, b, c, d, e in the 657-line signal into four lines a, f, g, h in accordance with the relationships $a=a, f=(3b+c)/4, g=(c+d)/2$, and $h=(d+3e)/4$. Line scan converter 14 may be of any suitable type known in the art, for example, the interpolator disclosed in U.S. Pat. No. Re. 31,460, which is hereby incorporated by reference.

The output from line scan converter 14 is applied to a demultiplexer 16 which is suitably clocked so that the portions of the converted signal constituting the areas A, B1 and B2 shown in FIG. 3A appear, respectively, at the three outputs thereof. The output corresponding to the area A is then applied to a 5:3 time expander 18, which may be a buffer memory and which prolongs each of the lines in area A to the standard 52.5 $\mu S$ and also reduces the bandwidth to the standard 4.2 MHz., and then is applied to a digital-to-analog converter (DAC) 20 for application to a first television transmitter (not shown) as the first transmission signal.

The output from ADC 10 is also applied to a high pass filter 22 having a cut-off frequency of 7.0 MHz., and then to a spatio-temporal converter 24, which selects portions of the high spatial frequency information applied thereto for multiplexing into the second transmission signal. To this end, the output from spatio-temporal converter 24 is applied to a multiplexer 26.

Multiplexer 26 also receives every fifth line in the digitized high resolution television signal, identified as line b in the line scan converter 14. Each line b, which has a duration of approximately 42 $\mu S$, is then cut in half in formatter 28 and each half is subjected to a 5:3 time expansion in time expander 30. In the time expander 18, the bandwidth of each half of line b is reduced to 4.2 MHz. while the time duration is increased to approximately 35 $\mu S$. This signal is then applied to multiplexer 26. Multiplexer 26 may then be clocked at the standard line frequency $f_h$, and the output signal therefrom applied to multiplexer 32.

Multiplexer 32 also receives the low spatial frequency information corresponding to areas B1 and B2 from demultiplexer 16 after these signals have been subjected to a 5:3 time expansion in time expanders 34 and 36, respectively. The resulting time duration of each line in each of the signals B1 and B2 is now approximately 8.7 $\mu S$ and has a bandwidth of 4.2 MHz. Multiplexer 32 thus forms each line of the second transmission signal by combining a line from B1, a line section from either time expander 30 or spatio-temporal converter 24, and a line from B2, resulting in lines having a duration of approximately 52.5 $\mu S$, which corresponds with the NTSC standard. This signal is then applied to digital-to-analog converter (DAC) 38 for application to a second television transmitter as the second transmission signal.

Figure 6A:
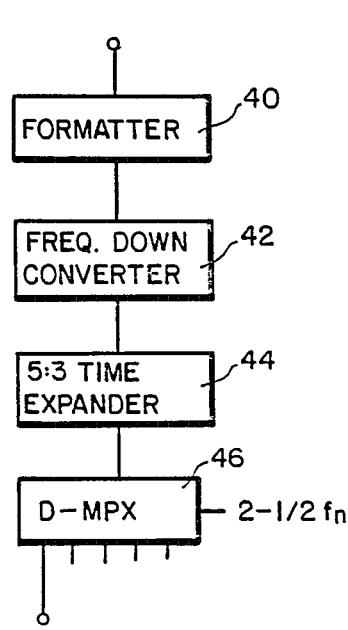
FIGS. 6A-6C show, in block diagram form, embodiments for a spatio-temporal converter.

There are various ways in which the spatio-temporal converter 24 can be arranged. In FIG. 6A, the signal from high-pass filter 22 is divided into half-line segments in formatter 40. These segments are then frequency converted in converter 42 to lie within the bandwidth 0-7.0 MHz. This down converted signal, comprising half-line segments, is then subjected to a 5:3 time expansion in time expander 44, making each half-line segment approximately 35 $\mu S$ in duration with a bandwidth of 4.2 MHz. The output of time expander 44 is then applied to a five-output demultiplexer 46 clocked at 2½ times the standard line frequency $f_h$. The purpose of demultiplexer 46 is to select one out of every five half-line segments applied thereto. Therefore, any of the outputs of demultiplexer 46 constitutes the output of the spatio-temporal converter 24, which is then coupled to multiplexer 26.

Figure 6B:
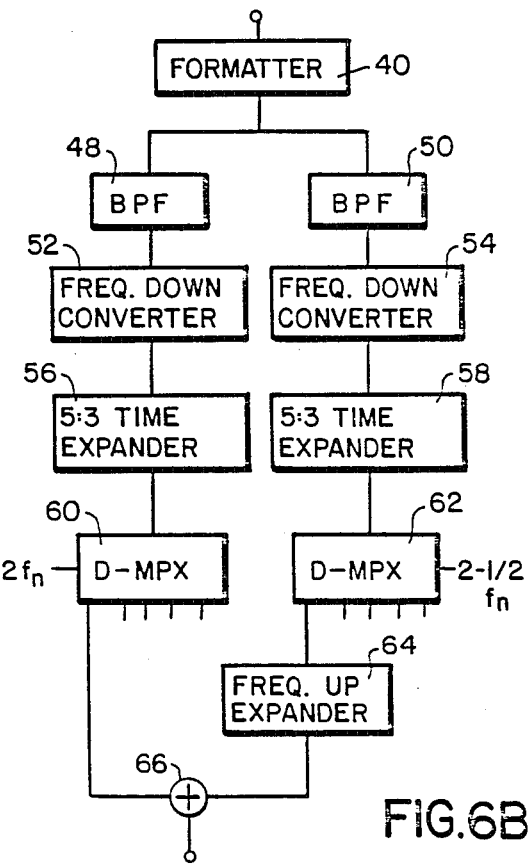

FIG. 6B shows a second embodiment of the spatio-temporal converter 24. The signal from high-pass filter 22 is divided into half-line segments in formatter 40. The output from formatter 40 is applied in parallel to bandpass filters 48 and 50 which have the passbands 7.0-10.5 MHz. and 10.5-14.0 MHz., respectively. The outputs of these filters 48 and 50 are frequency converted to the frequency range 0-3.5 MHz. in the frequency converters 52 and 54, respectively, and then subjected to a 5:3 time expansion in time expanders 56 and 58, respectively. The half-line segments at the respective outputs of time expanders 56 and 58 are 35 $\mu S$ in duration and occupy the frequency band 0-2.1 MHz. These half-line segments are then applied to demultiplexers 60 and 62, respectively, which each have five outputs and are clocked at the rate 2½ times $f_h$. The signal on one of the outputs from demultiplexer 62 is frequency converted to the band 2.1-4.2 MHz. in frequency converter 64 and the converted signal is combined in adder 66 to the signal on one of the outputs from demultiplexer 60. The output of the adder 66 forms the output signal from the spatio-temporal converter 24.

Figure 6C:
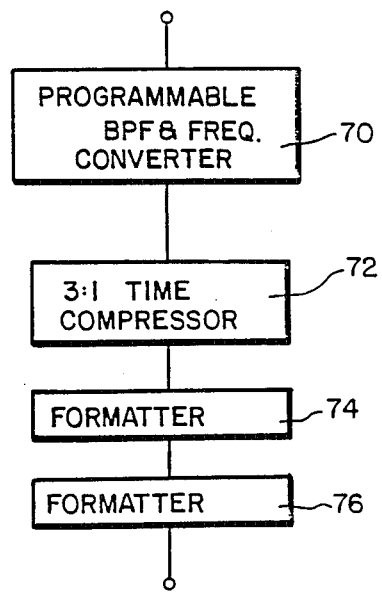

FIG. 6C shows another embodiment of the spatio-temporal converter 24. The signal from highpass filter 22 is applied to a programmable bandpass filter and frequency converter 70. The programmable filter/converter 70 divides the signal applied thereto into selected frequency bands and then frequency converts these selected bands to a single frequency band. In this example, the high spatial information occupying the frequency band 7.0-14.0 MHz. is divided into five selected frequency bands, for example, 7.0-8.4 MHz., 8.4-9.8 MHz., 9.8-11.2 MHz., 11.2-12.6 MHz. and 12.6-14.0 MHz. Each of these frequency bands, when selected, is frequency converted to the frequency band 0-1.4 MHz. The programmable filter/converter 70 cycles through the selected frequency bands at the standard picture frame rate ½$f_v$. U.S. Pat. No. 4,004,236 discloses a programmable bandpass filter which may be used in the programmable filter/converter 70 herein and is hereby incorporated by reference. The frequency converter portion may be of any suitable design.

The output from the programmable filter/converter 70 is then subjected to a 3:1 time compression in time compressor 72 which reduces the duration of each line to 14 $\mu S$ and increases the bandwidth to 4.2 MHz. A first formatter 74 is used to physically divide each of the compressed lines in half. A second formatter 76 then combines every five of the input half-lines into a new line, which results in a signal having 262 lines/frame, with a line duration of 35 $\mu S$ and a bandwidth of 4.2 MHz.

Figure 7:
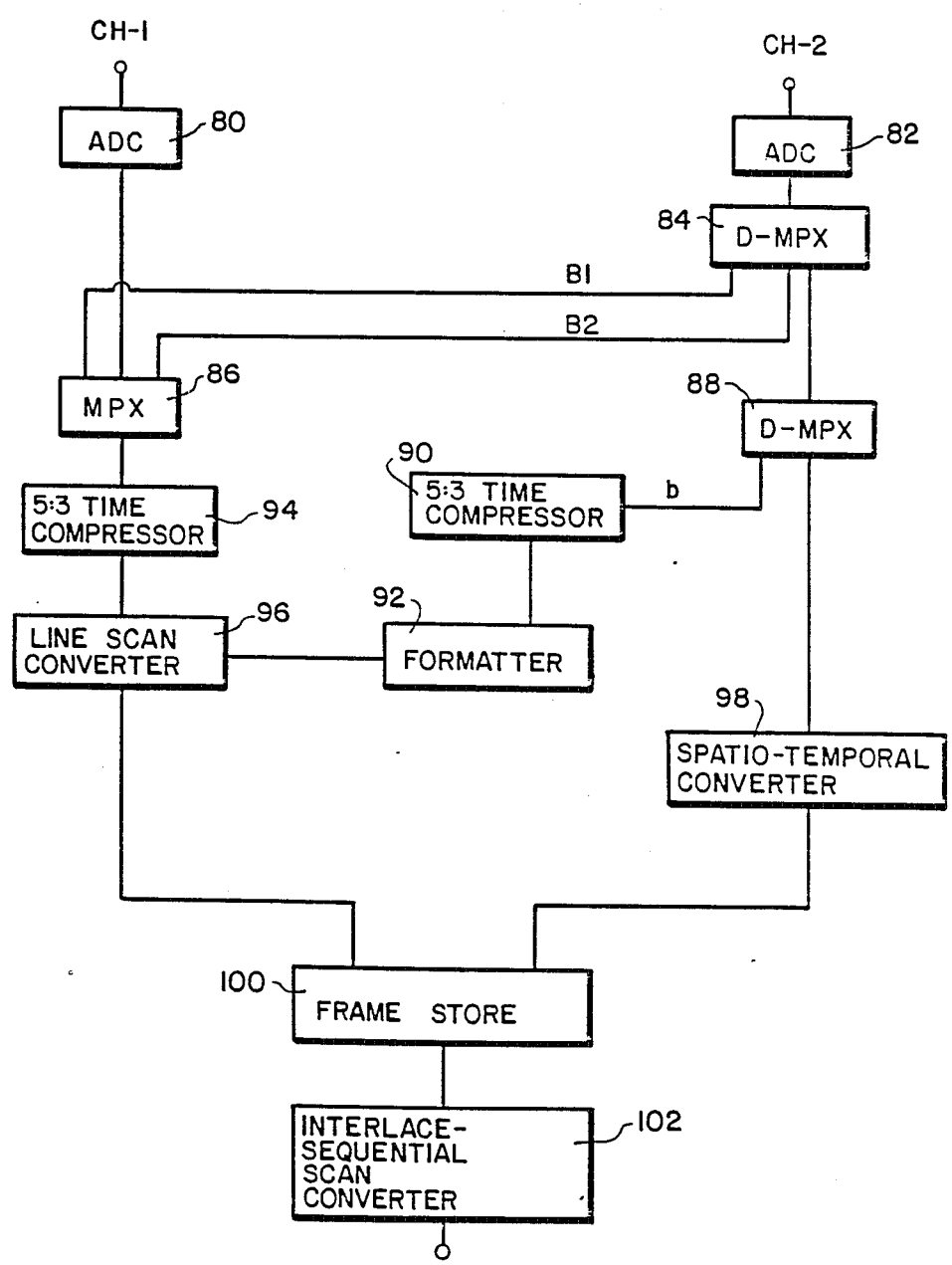
FIG. 7 shows, in block diagram form, an embodiment for reconstructing the high-resolution television signal from the two transmission signals.

FIG. 7 shows, in block diagram form, an embodiment for reconstructing the high-resolution television signal from the two transmission signals. The active video portions of the first and second transmission signals are applied to respective analog-to-digital converters (ADC) 80 and 82. The output of ADC 82 is then applied to a demultiplexer 84 which provides at two of its three outputs, signals representative of the areas B1 and B2. These two signals, along with the output signal from ADC 80 representing area A, are applied to a multiplexer 86 for forming a low resolution television signal having 525 lines/frame and an aspect ratio of 5⅓:3. The third output of demultiplexer 84, containing the lines b and the multiplexed high-frequency information, is applied to a demultiplexer 88 having two outputs. The output of demultiplexer 88 containing the lines b is applied to a 5:3 time compressor 90 and a formatter 92, which combines every two half-line segments in the signal b into a single line. The output of multiplexer 86 is also applied to a 5:3 time compressor 94 and, along with the output of formatter 92, is applied to a line scan converter 96 which is the complement to line scan converter 14. This line scan converter 96 converts four input lines a, f, g, h from multiplexer 86 and line b from demultiplexer 88 into the original five lines a–e in accordance with the relationships $a=a$, $b=b$, $c=4f-3b$, $d=2g-c$, and $e=(4h-d)/3$.

The other output of demultiplexer 88 containing the multiplexed high-frequency information is applied to a spatio-temporal converter 98. Spatio-temporal converter 98 is the complement to the spatio-temporal converter 24 and converts the multiplexed high-frequency information back into its original format for combination with the low-frequency information.

The output signal from the line scan converter 96 and the output signal from the spatio-temporal converter 98 are applied to a frame store 100 which combines the two signals and provides a high-resolution television signal at the output thereof.

In order to double the perceived vertical resolution, this signal is then applied to an interlace-to-sequential scan converter 102 which generates additional lines between the lines of the signal applied thereto, thereby, in effect, converting the two-field interlaced 657-line signal having a picture frame rate of 30 hertz, into sequentially-scanned 60-hertz picture frames each having substantially 657 lines. Scan converter 102 may be of any suitable design, for example, that disclosed in U.S. Pat. No. 4,468,693 to Fujita et al, which is hereby incorporated by reference.

Numerous alterations to the structure disclosed herein will suggest themselves to those skilled in the art. However, it is to be understood that the present disclosure relates to a preferred embodiment of the invention which is for purposes of illustration only and not to be construed as a limitation of the invention. All such modifications which do not depart from the spirit and scope of the invention are intended to be included within the appended claims.

What is claimed is:

1. A method of transmitting a high resolution television signal forming picture frames having a width which is wider than that of standard aspect ratio picture frame and having a bandwidth greater than that of a standard television signal, and high resolution television signal including a multiple of m scanning lines, where m is a standard number of scanning lines; said the method comprising converting said high-resolution television signal into a first and a second transmission signal in which at least the first transmission signal is compatible with a standard television receiver; said conversion comprising the steps of:

dividing said high resolution television signal into a low frequency portion and a high frequency portion;

converting said multiple of m scanning lines in said low frequency portion into m lines and selecting predetermined ones of said multiple of m scanning lines in said low frequency portion;

selecting information from said m lines relating to a selected portion of said high resolution television signal picture frame corresponding to said standard aspect ratio picture frame;

transmitting said selected information as the first transmission signal;

spatio-temporally converting said high frequency portion, by dividing said high-frequency portion into a plurality of components and multiplexing said components over the duration of several picture frames;

combining the converted high-frequency portion with the selected predetermined ones in said low frequency portion, and with the information from said m lines not relating to said selected portion; and transmitting said combined signal as the second transmission signal.

2. A method of transmitting a high resolution television signal as claimed in claim 1, wherein said spatio-temporal conversion further comprises frequency down-converting and bandwidth limiting said high-frequency portion of said high-resolution television signal such that it is within the bandwidth of said standard television signal.

3. A method of transmitting a high resolution television signal as claimed in claim 2, wherein in said spatio-temporal conversion, said high frequency portion is divided, by frequency, into p sections, where p is an integer, said sections being multiplexed in said second transmission signal whereby each one of said sections is included in a respective picture frame formed by said second transmission signal.

4. A method of transmitting a high resolution television signal as claimed in claim 1, wherein said high-resolution television signal forms picture frames having 657 scanning lines.

5. A method of transmitting a high resolution television signal as claimed in claim 1, wherein said picture frames of said high-resolution televison have an aspect ratio of 5⅓:3.

6. A television transmitter for transmitting a high-resolution television signal forming picture frames having a width which is wider than that of a standard aspect ratio picture frame and having a bandwidth greater than that of a standard television signal, said high-resolution television signal including multiple of m scanning lines, where m is a standard number of scanning lines, said transmitter comprising:

means for generating said high-resolution television signal;

means for converting said high-resolution television signal into a first and a second transmission signal in which at least said first transmission signal is compatible with a standard television receiver, said means for converting including means for dividing said high-resolution television signal into a low frequency portion and a high frequency portion;

means for converting said multiple of m scanning lines in said low frequency portion into m lines and for selecting predetermined ones of said multiple of m scanning lines in said low frequency portion;

means for selecting information from said m lines relating to a selected portion of said high resolution television signal picture frames corresponding to said standard aspect ratio picture frame, said selected information constituting said first transmission signal;

means for spatio-temporally converting said high frequency portion, which converting means comprises means for dividing said high frequency portion into a plurality of components over the duration of several picture frames;

means for combining said converted high frequency portion with the selected predetermined ones in said low frequency portion, and with the information from said m lines not relating to said selected portion; and means for simultaneously transmitting said first and second transmission signals on two separate television channels.

7. A television transmitter as claimed in claim 6, wherein said means for converting said multiple of m scanning lines comprises a line scan converter which generates four output lines a, f, g, h from every five input lines a, b, c, d, e using the relationships $a=a$, $f=(3b+c)/4$, $g=(c+d)/2$ and $h=(d+3e)/4$.

8. A television transmitter as claimed in claim 7, wherein the selected predetermined ones in said low frequency portion are the lines b.

9. A television receiver for use in receiving television signals transmitted by the television transmitter as claimed in claim 6, wherein said television receiver comprises:

means for simultaneously receiving said first and second transmission signals;

means for converting said first and second transmission signals into a reconstructed high-resolution television signal, said converting means including:

means for separating the information from said m lines not related to said selected portion from said second transmission signal;

means for combining said separated information with said received first transmission signal to form a wide television signal;

means for separating said selected predetermined ones in said low frequency portion from said second transmission signal;

means for combining said separated selected predetermined ones with said wide television signal to form a low frequency portion of said reconstructed high-resolution television signal;

means for spatio-temporally forming a high frequency portion of said reconstructed high-resolution television signal from said converted high frequency portion in said second transmission signal;

means for storing said formed low frequency portion in combination with said formed high frequency portion; and means for displaying the reconstructed high-resolution television signal from said storing means.

10. A television receiver as claimed in claim 9, wherein said means for combining said separated predetermined selected ones with said wide television signal comprises a line scan converter which generates five output lines a, b, c, d, e from four input lines a, f, g, h from said multiplexer and line b from said second demultiplexer using the relationships $a=a$, $b=b$, $c=4f-3b$, $d=2g-c$ and $e=(4h-d)/3$.

11. A television receiver as claimed in claim 9, wherein said television receiver further comprises an interlace-to-sequential converter coupled between said means for storing and said displaying means for generating intervening lines between the lines in each field of said reconstructed high-resolution television signal thereby effectively generating a sequentially scanned picture frame having a frame rate which is twice that of said standard television signal.

* * * * *